(12) United States Patent
Kwon et al.

(10) Patent No.: US 12,189,194 B2
(45) Date of Patent: Jan. 7, 2025

(54) RECEIVER OPTICAL SUB-ASSEMBLY, MULTI-CHANNEL RECEIVER OPTICAL SUB-ASSEMBLY, AND OPERATING METHOD THEREOF

(71) Applicant: ELECTRONICS AND TELECOMMUNICATIONS RESEARCH INSTITUTE, Daejeon (KR)

(72) Inventors: Won Bae Kwon, Daejeon (KR); Jong Jin Lee, Daejeon (KR); Eun Kyu Kang, Daejeon (KR); Soo Yong Jung, Daejeon (KR); Hae Chung Kang, Daejeon (KR); Sang Jin Kwon, Daejeon (KR); Dae Seon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 118 days.

(21) Appl. No.: 17/862,930

(22) Filed: Jul. 12, 2022

(65) Prior Publication Data

US 2023/0069724 A1 Mar. 2, 2023

(30) Foreign Application Priority Data

Aug. 25, 2021 (KR) .......................... 10-2021-0112259
Nov. 22, 2021 (KR) .......................... 10-2021-0161461

(51) Int. Cl.
*G02B 6/42* (2006.01)
*H04B 10/60* (2013.01)

(52) U.S. Cl.
CPC ........... *G02B 6/4214* (2013.01); *H04B 10/60* (2013.01)

(58) Field of Classification Search
CPC ..................................................... G02B 6/4214
See application file for complete search history.

(56) References Cited

U.S. PATENT DOCUMENTS

| 7,792,401 | B2 | 9/2010 | Kang et al. |
| 10,379,301 | B2 | 8/2019 | Luo et al. |
| 10,447,405 | B2 | 10/2019 | Kang et al. |
| 10,877,213 | B2 | 12/2020 | Xie et al. |

(Continued)

FOREIGN PATENT DOCUMENTS

| JP | 2001281486 A | * 10/2001 |
| KR | 10-2021-0010068 A | 1/2021 |
| KR | 10-2021-0068339 A | 6/2021 |

OTHER PUBLICATIONS

English translation of JP_S6168212_U (Year: 1986).*

*Primary Examiner* — Charlie Y Peng
(74) *Attorney, Agent, or Firm* — LRK PATENT LAW FIRM (57) ABSTRACT

An optical receiver sub-assembly is provided, which includes a substrate, an optical waveguide device mounted on the substrate to transfer ray incident from a ray source, and a photodetector mounted on the substrate and disposed under a vertical cross-sectional surface of the optical waveguide device, wherein the ray is sequentially reflected and refracted by an upper slope surface and a lower slope surface provided in the vertical cross-sectional surface and is vertically incident on an active area of the photodetector.

10 Claims, 5 Drawing Sheets

130: 132, 134
140: 142, 144, 146 AND 148

(56) References Cited

U.S. PATENT DOCUMENTS

| | | | |
|---|---|---|---|
| 2003/0010904 A1* | 1/2003 | Luo | G02B 6/4214 250/227.11 |
| 2010/0142563 A1* | 6/2010 | Hu | H01S 3/06708 372/6 |
| 2011/0075132 A1* | 3/2011 | Sutherland | G02B 6/262 356/138 |

* cited by examiner

RECEIVER OPTICAL SUB-ASSEMBLY, MULTI-CHANNEL RECEIVER OPTICAL SUB-ASSEMBLY, AND OPERATING METHOD THEREOF

CROSS-REFERENCE TO RELATED APPLICATIONS

This application claims the benefit of the Korean Patent Application Nos. 10-2021-0112259 filed on Aug. 25, 2021 and 10-2021-0161461 filed on Nov. 22, 2021, which are hereby incorporated by reference as if fully set forth herein.

BACKGROUND

1. Field of the Invention

The present invention relates to an optical coupling structure of a multi-channel optical receiver sub-assembly used in a high speed optical communication network.

2. Description of Related Art

Optical transceiver modules include an optical sub-assembly (OSA) which converts an optical signal into an electrical signal or converts an electrical signal into an optical signal and an electrical sub-assembly (ESA) which performs signal processing on an electrical signal.

The OSA includes a transmitter optical sub-assembly (TOSA) which converts an electrical signal into an optical signal and a receiver optical sub-assembly (ROSA) which converts a received optical signal into an electrical signal.

Recently, as a massive video service and a virtualization service such as augmented reality (AR) and virtual reality (VR) increase, data traffic is increasing progressively, and thus, a multi-channel ROSA for receiving massive high speed data is needed.

For example, an ROSA of 400 Giga or more is manufactured by arranging 4-channel photodiodes, having an optical reception speed of 100 Gbps per unit channel, in parallel for each channel of an optical waveguide device such as 4-channel arrayed waveguide grating (AWG) having an optical de-multiplexing function on the basis of wavelength division de-multiplexing.

Figure 1:
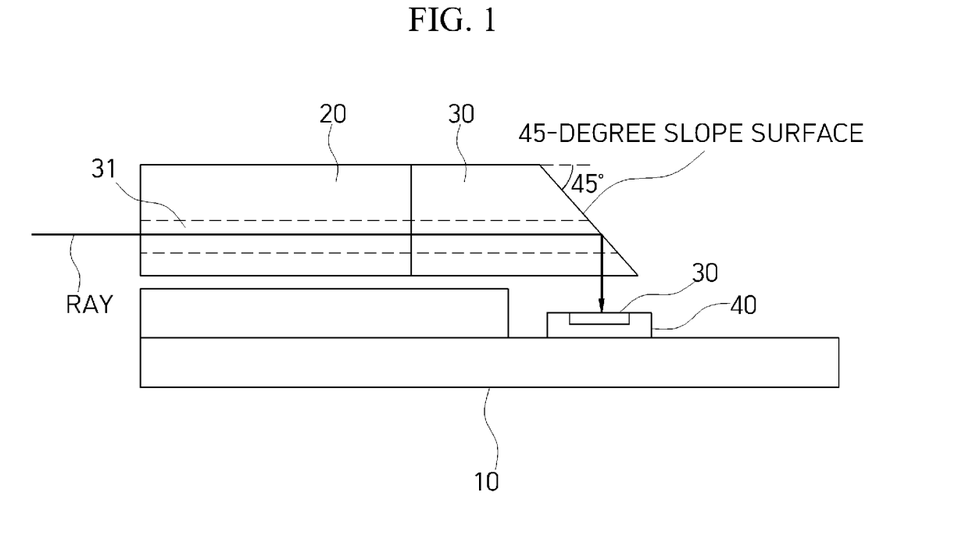
FIG. 1 is a diagram illustrating a structure of a conventional optical receiver sub-assembly to which an optical waveguide device having a 45-degree reflection structure is applied.

FIG. 1 is a diagram illustrating a structure of a conventional optical receiver sub-assembly to which an optical waveguide device having a 45-degree reflection structure is applied.

Referring to FIG. 1, the conventional optical receiver sub-assembly includes a wavelength division multiplexing-based optical waveguide device 20, to which a reflector 30 including a 45-degree slope surface is applied, and a photodetector device 40.

In advantages of such a structure, ray traveling through an optical waveguide core 31 may collect on an active area 30 of a photodetector device 40 in a vertical direction through the reflector 30 of the optical waveguide device 20, and thus, a manufacturing process may be simplified and the ray collection efficiency of the active area 30 may increase.

However, when the reflector 30 including the 45-degree slope surface is attached on the optical waveguide device 20, the loss of ray may occur due to a ray alignment error between an optical waveguide core 31 of the optical waveguide device 20 and an optical waveguide core 31 of the reflector 30. Also, there is a drawback where the manufacturing cost increases due to the reflector 30 attached on the optical waveguide device 20.

SUMMARY

An aspect of the present invention is directed to providing a multi-channel optical receiver sub-assembly for decreasing the manufacturing cost and the loss of ray caused by a ray alignment error.

To achieve these and other advantages and in accordance with the purpose of the invention, as embodied and broadly described herein, there is provided an optical receiver sub-assembly including a substrate, an optical waveguide device mounted on the substrate to transfer ray incident from a ray source, and a photodetector mounted on the substrate and disposed under a vertical cross-sectional surface of the optical waveguide device, wherein the ray is sequentially reflected and refracted by an upper slope surface and a lower slope surface provided in the vertical cross-sectional surface and is vertically incident on an active area of the photodetector.

In an embodiment, the upper slope surface reflects the ray, the lower slope surface refracts ray reflected by the upper slope surface, and ray refracted by the lower slope surface is vertically incident on a surface of the active area.

In an embodiment, the optical waveguide device includes an optical waveguide core transferring the incident ray and an optical waveguide clad surrounding the optical waveguide core and having a refractive index which is less than a refractive index of the optical waveguide core, the upper slope surface is a vertical cross-sectional surface of the optical waveguide core, and the lower slope surface is a vertical cross-sectional surface of the optical waveguide clad.

In an embodiment, the upper slope surface reflects ray incident from a ray source, a boundary interface between the optical waveguide core and the optical waveguide clad refracts the ray, reflected by the upper slope surface, at a first refraction angle "$\theta_{cladding}$", and the lower slope surface refracts the ray, refracted at the first refraction angle "$\theta_{cladding}$", at a second refraction angle "$\theta_{air}$" to vertically irradiate the refracted ray onto a surface of the active area.

In an embodiment, a slope angle "$\theta_{pol1}$" of the upper slope surface is set based on a ratio "$n_{air}/n_{core}$" of a refractive index "$n_{air}$" of external air to a refractive index "$n_{core}$" of the optical waveguide core.

In an embodiment, a slope angle "$\theta_{pol2}$" of the lower slope surface is set based on a slope angle "$\theta_{pol1}$" of the upper slope surface, a refractive index "$n_{cladding}$" of the optical waveguide clad, and a ratio "$n_{core}/n_{cladding}$" of a refractive index "$n_{core}$" of the optical waveguide core to a refractive index "$n_{cladding}$" of the optical waveguide clad.

In an embodiment, a slope angle "$\theta_{pol2}$" of the lower slope surface is set based on the first refraction angle "$\theta_{cladding}$" and the second refraction angle "$\theta_{air}$".

In another aspect of the present invention, there is provided a multi-channel optical receiver sub-assembly including a plurality of optical receiver sub-assemblies arranged by channel units, wherein each of the plurality of optical receiver sub-assemblies includes a substrate, an optical waveguide device mounted on the substrate to transfer ray incident from a ray source, and a photodetector mounted on the substrate and disposed under a vertical cross-sectional surface of the optical waveguide device, and the ray is reflected and refracted by an upper slope surface and a lower slope surface provided in the vertical cross-sectional surface and is vertically incident on an active area of the photodetector.

In another aspect of the present invention, there is provided an operating method of an optical receiver sub-assembly, the operating method including a step of irradiating ray from a ray source onto an optical waveguide device, a step of reflecting the irradiated ray by using an upper slope surface provided in a vertical cross-sectional surface of the optical waveguide device, a process of refracting the ray reflected by the upper slope surface by using the lower slope surface provided in the vertical cross-sectional surface of the optical waveguide device, and a step of vertically irradiating ray refracted by the lower slope surface onto an active area of a photodetector disposed under the vertical cross-sectional surface.

It is to be understood that both the foregoing general description and the following detailed description of the present invention are exemplary and explanatory and are intended to provide further explanation of the invention as claimed.

DETAILED DESCRIPTION OF THE INVENTION

The present invention may have diverse modified embodiments, and thus, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout. It will be understood that although the terms including an ordinary number such as first or second are used herein to describe various elements, these elements should not be limited by these terms. These terms are only used to distinguish one element from another element.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Figure 2:
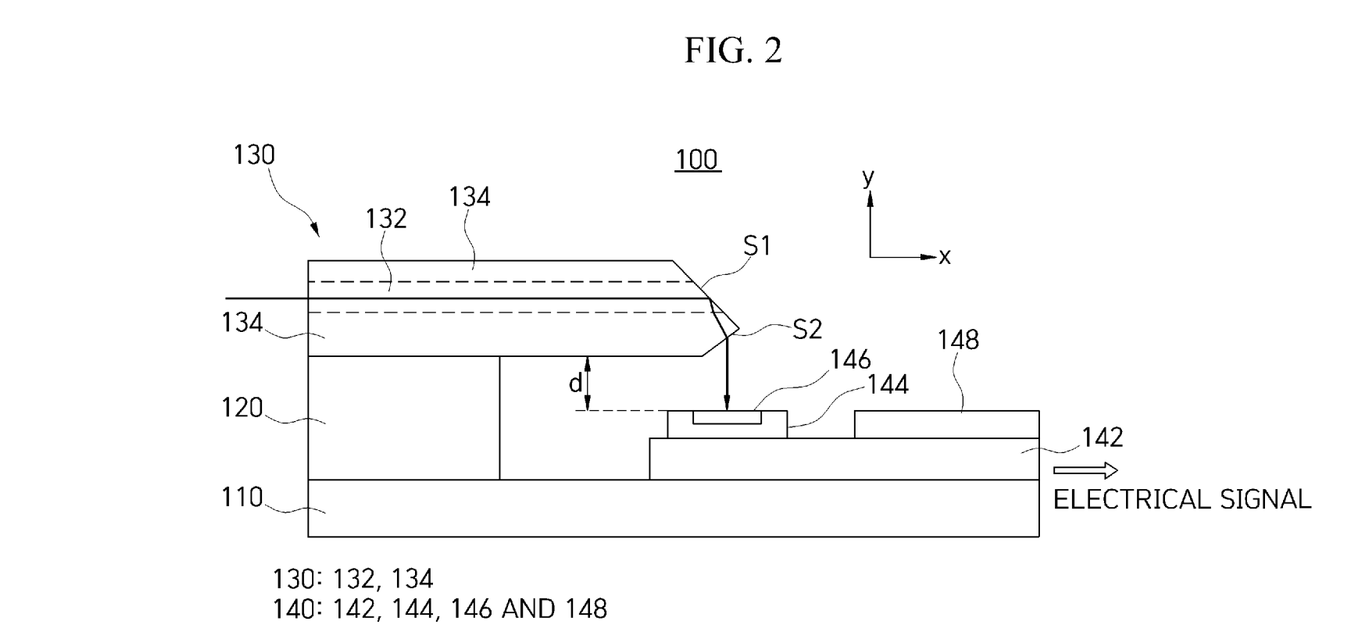
FIG. 2 is a side view of a multi-channel optical receiver sub-assembly according to an embodiment of the present disclosure.

FIG. 2 is a side view of a multi-channel optical receiver sub-assembly 100 according to an embodiment of the present disclosure.

Referring to FIG. 2, the multi-channel optical receiver sub-assembly 100 according to an embodiment of the present disclosure may include a main substrate 110, a mount unit 120, an optical waveguide device 130, and a plurality of photodetector modules 140 (142, 144, 146, and 148).

The optical waveguide device 130 may be mounted on the main substrate 110 by using the mount unit 120. The present invention may not be characterized in the mount unit 120, and thus, descriptions of a structure, a shape, and a material of the mount unit 120 may be omitted and may be replaced by technology known to those skilled in the art.

The photodetector module 140 may be mounted on the main substrate 110 also.

The photodetector module 140 may include a photodetector substrate 142, a photodetector 144, and a preamplifier 148.

The photodetector substrate 142 may be mounted on the main substrate 110.

The photodetector 144 and the preamplifier 148 may be mounted on the photodetector substrate 142.

The photodetector 144 may include an active area (or a ray receiving device) 146, and the active area 146 may be disposed under a vertical cross-sectional surface of the optical waveguide device 130 and may convert ray, which is vertical incident from the vertical cross-sectional surface (or a lower slope surface to be described below) of the optical waveguide device 130, into an electrical signal. Also, the preamplifier 148 may amplify and output the electrical signal obtained through conversion by the photodetector 144.

Moreover, the photodetector 144 may be disposed at an appropriate position under the vertical cross-sectional surface of the optical waveguide device 130 so that the ray is incident on a center of the active area 146. In this case, an interval d between the optical waveguide device 130 and the photodetector 144 may be intactly maintained by the mount unit 120 and the photodetector substrate 142.

The optical waveguide device 130 (132 and 134) for determining an optical structure of the optical receiver sub-assembly 100 may have a structure where ray incident from a ray source (not shown) is vertically incident on the active area 146 of the photodetector 144.

To this end, the optical waveguide device 130 may include an optical waveguide core 132 and an optical waveguide clad 134 which surrounds an optical waveguide core 132.

The optical waveguide core 132 may transfer ray which is incident from the ray source (not shown). Particularly, a vertical cross-sectional surface of the optical waveguide core 132 may be configured to include a first slope surface (or an upper slope surface) S1 which is set by a certain angle for enabling ray, traveling through the optical waveguide core 132, to be totally reflected, on the basis of a refractive index of the optical waveguide core 132 and air.

The optical waveguide clad 134 may be less in refractive index than the optical waveguide core 132 and may prevent the loss of ray which is transferred through the optical waveguide core 132. Particularly, the vertical cross-sectional surface of the optical waveguide clad 134 may be configured to include a second slope surface (or a lower slope surface) S2 which again changes a traveling direction angle of ray reflected by the first slope surface (or an upper slope surface) so as to be vertically incident on the active area 146 of the photodetector 144.

Hereinafter, a ray path of ray traveling through the optical waveguide device 130 including a vertical cross-sectional surface including two slope surfaces S1 and S2 will be described in detail.

Figure 3:
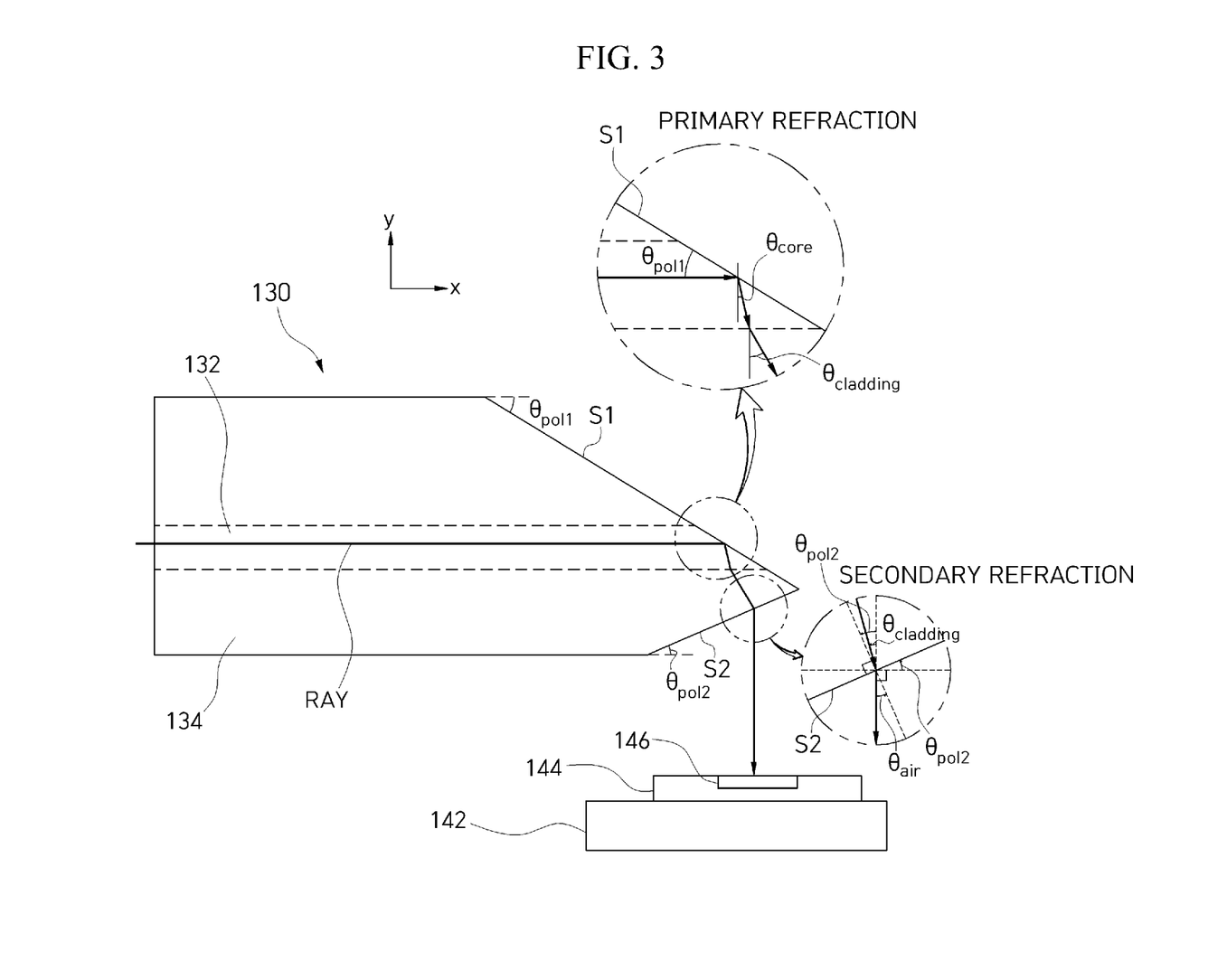
FIG. 3 is an enlarged side view of a vertical cross-sectional surface of an optical waveguide device for describing an optical path of an optical waveguide device illustrated in FIG. 2.

FIG. 3 is an enlarged side view of a vertical cross-sectional surface of an optical waveguide device for describing an optical path of an optical waveguide device illustrated in FIG. 2.

Referring to FIG. 3, ray traveling through the optical waveguide core 132 may be reflected at an angle "$\theta_{core}$" by the upper slope surface S1, which is set by a slope angle "$\theta_{pol1}$" induced from the following Equation 1 representing a total reflection condition based on a ratio of a reflective index of external air to a refractive index "$n_{core}$" of the optical waveguide core 132 at the vertical cross-sectional surface of the optical waveguide core 132, in the optical waveguide core 132.

$$\theta_{pol1} < 90 - \sin^{-1}\left(\frac{n_{air}}{n_{core}}\right) \quad \text{[Equation 1]}$$

Subsequently, ray refracted in a boundary interface between the optical waveguide core 132 and the optical waveguide clad 134 by a difference between a refractive index of the optical waveguide core 132 and a refractive index of the optical waveguide clad 134 may be incident on an inner portion of the optical waveguide clad 134 at an angle (a first refraction angle) "$\theta_{cladding}$" induced from the following Equation 2.

$$\theta_{cladding} = \sin^{-1}\left(\frac{n_{core}}{n_{cladding}}\sin(90 - 2\theta_{pol1})\right) \quad \text{[Equation 2]}$$

Here, $n_{cladding}$ may be a refractive index of the optical waveguide clad 134.

Ray refracted in a boundary interface between the optical waveguide clad 134 and external air by a refractive index difference between the optical waveguide clad 134 and the external air may be incident on the external air at an angle (a second refraction angle) "$\theta_{air}$" induced from the following Equation 3.

$$\theta_{air} = \sin^{-1}(n_{cladding}(\sin(\theta_{pol2} - \theta_{cladding}))) \quad \text{[Equation 3]}$$

In this case, because an angle "$\theta_{air}$" is equal to a slope angle "$\theta_{pol2}$" of the lower slope surface S2 which is set so that ray is output in a direction vertical to a surface of the active area 146 at the boundary interface between the optical waveguide clad 134 an the external air, the angle "$\theta_{air}$" may be substituted with the slope angle "$\theta_{pol2}$" of the lower slope surface S2 in Equation 3, and the arrangement of Equation 2 and Equation 3 may be set as in the following Equation 4.

$$\theta_{pol2} \approx \sin^{-1}\left(n_{cladding}\left(\sin\left(\theta_{pol2} - \sin^{-1}\left(\frac{n_{core}}{n_{cladding}}\sin(90 - 2\theta_{pol1})\right)\right)\right)\right) \quad \text{[Equation 4]}$$

Therefore, ray propagated through the optical waveguide device 130 may be incident in a direction vertical to the active area 146 of the photodetector 144 by using the upper slope surface S1 and the lower slope surface S2 provided in a vertical cross-sectional surface of the optical waveguide device 130.

In a case where the optical receiver sub-assembly 100 described above is applied to a multi-channel wavelength division de-multiplexer such as an arrayed waveguide (AWG) device, a plurality of optical receiver sub-assemblies may be arranged in parallel by channel units, and thus, a multi-channel optical receiver sub-assembly may be implemented.

Figure 4:
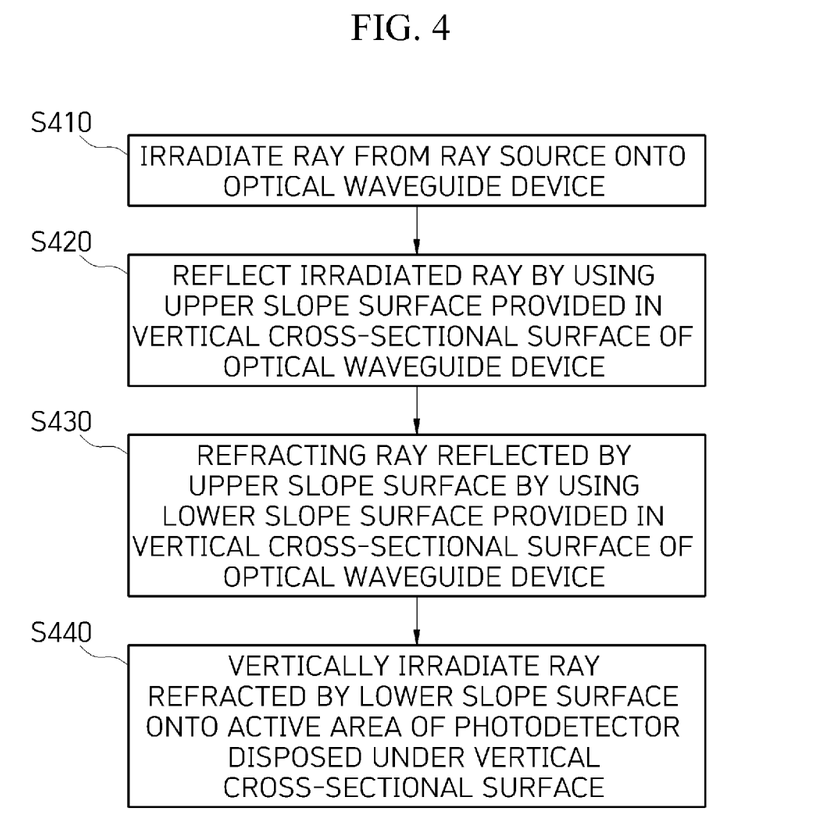
FIG. 4 is a flowchart illustrating an operating method of an optical receiver sub-assembly according to an embodiment of the present disclosure.
Figure 5:
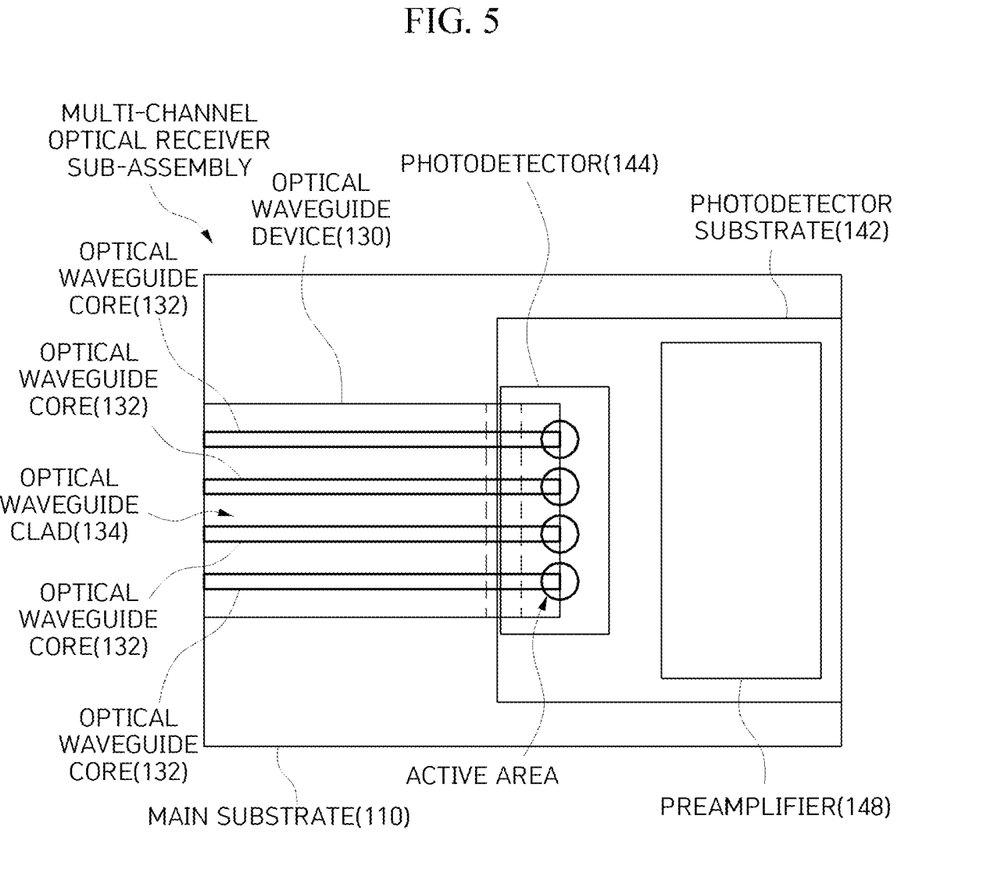

FIG. 4 is a flowchart illustrating an operating method of an optical receiver sub-assembly according to an embodiment of the present disclosure.

Referring to FIG. 4, in step S410, a process of irradiating ray from a ray source onto the optical waveguide device 130 may be performed.

In step S420, a process of reflecting the irradiated ray by using the upper slope surface S1 provided in the vertical cross-sectional surface of the optical waveguide device 130 may be performed.

In step S430, a process of refracting ray reflected by the upper slope surface S1 by using the lower slope surface S2 provided in the vertical cross-sectional surface of the optical waveguide device 130 may be performed.

In step S440, a process of vertically irradiating ray refracted by the lower slope surface S2 onto the active area 146 of the photodetector 144 disposed under the vertical cross-sectional surface may be performed.

In an embodiment, when the optical waveguide device 130 includes the optical waveguide core 132 and the optical waveguide clad 134 which surrounds the optical waveguide core 132 and is less in refractive index than the optical waveguide core 132, a step of reflecting the ray from the upper slope surface provided in the vertical cross-sectional surface of the optical waveguide device may be a step of reflecting the ray from the upper slope surface provided at a certain slope angle "$\theta_{pol1}$" in the vertical cross-sectional surface of the optical waveguide core 132.

In an embodiment, the certain slope angle "$\theta_{pol1}$" may be based on a ratio "$n_{air}/n_{core}$" of the refractive index "$n_{air}$" of the external air to the refractive index "$n_{core}$" of the optical waveguide core 132.

In an embodiment, a step of refracting the ray reflected by the upper slope surface S1 by using the lower slope surface S2 provided at a certain slope angle "$\theta_{pol2}$" in the vertical cross-sectional surface of the optical waveguide device 130 may be a step of refracting the ray reflected by the upper slope surface S1 by using the lower slope surface S2 provided in the vertical cross-sectional surface of the optical waveguide clad 134.

In an embodiment, the certain slope angle "$\theta_{pol2}$" may be set based on the certain slope angle "$\theta_{pol1}$" of the upper slope surface S1, the refractive index "$n_{cladding}$" of the optical waveguide clad 134, and a ratio "$n_{core}/n_{cladding}$" of the refractive index "$n_{core}$" of the optical waveguide core 132 to the refractive index "$n_{cladding}$" of the optical waveguide clad 134.

In an embodiment, a step of refracting the ray reflected by the upper slope surface by using the lower slope surface provided in the vertical cross-sectional surface of the optical waveguide clad may include a step of primarily refracting the ray reflected by the upper slope surface S1 by using a boundary interface between the optical waveguide core 132 and the optical waveguide clad 134 to irradiate the refracted ray onto an inner portion of the optical waveguide clad 134 and a step of secondarily refracting the primarily refracted ray by using a boundary interface between the optical waveguide clad 134 and the external air.

According to the embodiments of the present invention, a reflector included in a vertical cross-sectional surface of a conventional optical waveguide device may be removed, a vertical cross-sectional surface of an optical waveguide device may be implemented with two slope surfaces, and ray traveling in an optical waveguide core may be totally reflected to be vertically incident on an active area of a photodetector disposed thereunder through the vertical cross-sectional surface implemented with the two slope surfaces. Accordingly, the loss of ray caused by a ray alignment error and the manufacturing cost may be reduced, and a structure may be proposed where ray is vertically incident on an active area of an optical photodetector despite a structure where a vertical cross-sectional surface is implemented with the two slope surfaces, thereby considerably improving ray coupling efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical receiver sub-assembly comprising:
   a substrate;
   an optical waveguide device mounted on the substrate to transfer ray incident from a ray source; and
   a photodetector mounted on the substrate and disposed under a vertical cross-sectional surface of the optical waveguide device,
   wherein the ray is sequentially reflected and refracted by an upper slope surface and a lower slope surface provided in the vertical cross-sectional surface and is vertically incident on an active area of the photodetector,
   wherein the optical waveguide device comprises:
   an optical waveguide core transferring the incident ray; and
   an optical waveguide clad surrounding the optical waveguide core and having a refractive index which is less than a refractive index of the optical waveguide core,
   wherein the upper slope surface is a vertical cross-sectional surface of the optical waveguide core, and the lower slope surface is a vertical cross-sectional surface of the optical waveguide clad,
   wherein the upper slope surface reflects ray incident from a ray source,
   a boundary interface between the optical waveguide core and the optical waveguide clad refracts the ray, reflected by the upper slope surface, at a first refraction angle "$\theta_{cladding}$", and
   the lower slope surface refracts the ray, refracted at the first refraction angle "$\theta_{cladding}$", at a second refraction angle "$\theta_{air}$" to vertically irradiate the refracted ray onto a surface of the active area.

2. The optical receiver sub-assembly of claim 1, wherein: the upper slope surface reflects the ray,
   the lower slope surface refracts ray reflected by the upper slope surface, and ray refracted by the lower slope surface is vertically incident on a surface of the active area.

3. The optical receiver sub-assembly of claim 1, wherein a slope angle "$\theta_{po11}$" of the upper slope surface is set based on a ratio "$n_{air}/n_{core}$" of a refractive index "$n_{air}$" of external air to a refractive index "$n_{core}$" of the optical waveguide core.

4. The optical receiver sub-assembly of claim 1, wherein a slope angle "$\theta_{po12}$" of the lower slope surface is set based on a slope angle "$\theta_{po11}$" of the upper slope surface, a refractive index "$n_{cladding}$" of the optical waveguide clad, and a ratio "$n_{core}/n_{cladding}$" of a refractive index "$n_{core}$" of the optical waveguide core to a refractive index "$n_{cladding}$" of the optical waveguide clad.

5. The optical receiver sub-assembly of claim 1, wherein a slope angle "$\theta_{po12}$" of the lower slope surface is set based on the first refraction angle "$\theta_{cladding}$" and the second refraction angle "$\theta_{air}$".

6. A multi-channel optical receiver sub-assembly comprising:
   a plurality of optical receiver sub-assemblies arranged by channel units,
   wherein each of the plurality of optical receiver sub-assemblies comprises:
   a substrate;
   an optical waveguide device mounted on the substrate to transfer ray incident from a ray source; and
   a photodetector mounted on the substrate and disposed under a vertical cross- sectional surface of the optical waveguide device,
   wherein the ray is reflected and refracted by an upper slope surface and a lower slope surface provided in the vertical cross-sectional surface and is vertically incident on an active area of the photodetector,
   wherein the optical waveguide device comprises:
   an optical waveguide core transferring the incident ray; and
   an optical waveguide clad surrounding the optical waveguide core and having a refractive index which is less than a refractive index of the optical waveguide core,
   wherein the upper slope surface is a vertical cross-sectional surface of the optical waveguide core, and the lower slope surface is a vertical cross-sectional surface of the optical waveguide clad,
   wherein the upper slope surface reflects ray incident from a ray source,
   a boundary interface between the optical waveguide core and the optical waveguide clad refracts the ray, reflected by the upper slope surface, at a first refraction angle "$\theta_{cladding}$", and
   the lower slope surface refracts the ray, refracted at the first refraction angle "$\theta_{cladding}$", at a second refraction angle "$\theta_{air}$" to vertically irradiate the refracted ray onto a surface of the active area.

7. An operating method of an optical receiver sub-assembly, the operating method comprising:
   a step of irradiating ray from a ray source onto an optical waveguide device;
   a step of reflecting the irradiated ray by using an upper slope surface provided in a vertical cross-sectional surface of the optical waveguide device;
   a step of refracting the ray reflected by the upper slope surface by using the lower slope surface provided in the vertical cross-sectional surface of the optical waveguide device; and
   a step of vertically irradiating ray refracted by the lower slope surface onto an active area of a photodetector disposed under the vertical cross-sectional surface,
   wherein the optical waveguide device comprises an optical waveguide core and an optical waveguide clad surrounding the optical waveguide core,
   wherein the step of refracting the ray reflected by the upper slope surface by using the lower slope surface provided in the vertical cross-sectional surface of the optical waveguide device comprises a step of refracting the ray reflected by the upper slope surface by using the lower slope surface provided in the vertical cross-sectional surface of the optical waveguide clad, wherein the step of refracting the ray reflected by the upper slope surface by using the lower slope surface provided in the vertical cross-sectional surface of the optical waveguide clad comprises:

a step of primarily refracting the ray reflected by the upper slope surface by using a boundary interface between the optical waveguide core and the optical waveguide clad to irradiate the refracted ray onto an inner portion of the optical waveguide clad; and a step of secondarily refracting the primarily refracted ray by using a boundary interface between the optical waveguide clad and external air.

8. The operating method of claim 7, wherein:

the optical waveguide device comprises an optical waveguide core and an optical waveguide clad which surrounds the optical waveguide core and is less in refractive index than the optical waveguide core, and a step of reflecting the ray from the upper slope surface provided in the vertical cross-sectional surface of the optical waveguide device is a step of reflecting the ray from the upper slope surface provided at a certain slope angle in a vertical cross-sectional surface of the optical waveguide core.

9. The operating method of claim 8, wherein the certain slope angle is set based on a ratio "$n_{air}/n_{core}$" of a refractive index "$n_{air}$" of external air to a refractive index "$n_{core}$" of the optical waveguide core.

10. The operating method of claim 7, wherein the certain slope angle is set based on a slope angle "$\theta_{pol1}$" of the upper slope surface, a refractive index "$n_{cladding}$" of the optical waveguide clad, and a ratio "$n_{core}/n_{cladding}$" of a refractive index "$n_{core}$" of the optical waveguide core to a refractive index "$n_{cladding}$" of the optical waveguide clad.

\* \* \* \* \*